United States Patent
Umstot

(10) Patent No.: US 10,977,218 B1
(45) Date of Patent: Apr. 13, 2021

(54) DISTRIBUTED APPLICATION DEVELOPMENT

(71) Applicant: Amazon Technologies, Inc., Reno, NV (US)

(72) Inventor: James Alan Umstot, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 343 days.

(21) Appl. No.: 15/983,789

(22) Filed: May 18, 2018

(51) Int. Cl.
*G06F 16/182* (2019.01)
*G06F 16/13* (2019.01)
*G06F 16/188* (2019.01)
*G06F 16/18* (2019.01)

(52) U.S. Cl.
CPC .......... *G06F 16/182* (2019.01); *G06F 16/137* (2019.01); *G06F 16/1873* (2019.01); *G06F 16/192* (2019.01)

(58) Field of Classification Search
CPC .................................................... G06F 16/182
See application file for complete search history.

(56) References Cited

U.S. PATENT DOCUMENTS

| | | | | |
|---|---|---|---|---|
| 5,047,918 | A * | 9/1991 | Schwartz | G06F 16/16 |
| 9,323,765 | B1 * | 4/2016 | Stefanov | G06F 11/1088 |
| 2003/0115218 | A1 * | 6/2003 | Bobbitt | G06F 16/188 |
| 2003/0154112 | A1 * | 8/2003 | Neiman | G06F 9/5044 |
| | | | | 705/5 |
| 2009/0248765 | A1 * | 10/2009 | Akidau | G06F 11/004 |
| 2014/0172800 | A1 * | 6/2014 | Clark | G06F 16/1844 |
| | | | | 707/638 |
| 2015/0081773 | A1 * | 3/2015 | Ansel | G06F 16/958 |
| | | | | 709/203 |
| 2017/0011058 | A1 * | 1/2017 | Gheith | G06F 3/064 |
| 2018/0048733 | A1 * | 2/2018 | Pitts | G06F 12/0891 |
| 2018/0239559 | A1 * | 8/2018 | Venetsanopoulos | |
| | | | | G06F 3/0617 |

OTHER PUBLICATIONS

Lewis ("How to Clean Up Your Javascript Build with Tree Shaking", Ben Lewis, Aug. 15, 2016, blog.engineyard.com/tree-shaking) (Year: 2016).*

* cited by examiner

*Primary Examiner* — Etienne P Leroux
*Assistant Examiner* — Farhad Agharahimi
(74) *Attorney, Agent, or Firm* — Hogan Lovells US LLP

(57) ABSTRACT

Files for a large application can be managed using a distributed file system (DFS) and distributed processing system. Application files can be stored to nodes of an immutable DFS, where the nodes are part of a hierarchical representation of the file system. A distributed processing system enables multiple users to modify respective portions of the file system, where the users obtain only relevant subsets of the application files, allowing for efficient caching. New or modified files can be stored back to the respective nodes of the shared repository, such as by using objects with using names or identifiers that are unique to a particular version, such as may be generated by hashing contents of the files. The parent nodes in the hierarchical tree can be updated to reflect the portion of the tree that has changed, allowing for fast version control as other nodes do not have to be analyzed.

20 Claims, 9 Drawing Sheets

DISTRIBUTED APPLICATION DEVELOPMENT

BACKGROUND

As the complexity and functionality of various applications increases, there is a corresponding increase of the sizes of these applications. Large applications might have their files stored in a single repository, but this can provide challenges when performing incremental changes to the application. A developer wanting to make a modification to the application may have to load all the files for each version of an application, which for large files can require a substantial amount of memory to store and bandwidth to transfer. Further, conventional approaches to managing such files can prove challenging in managing version control for the applications.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of files for large applications, such as games or enterprise applications. Files for an application can be stored to nodes of an immutable, distributed file system (DFS), where the nodes are part of a hierarchical representation of the file system. A distributed processing system can enable multiple users to edit respective portions of the file system, where the users obtain only relevant subsets of the application files (allowing for efficient caching) and can store edits back to the shared repository. The changes can be saved as objects to the respective nodes using names or identifiers that are unique to a particular version, such as may be generated by hashing contents of the files. The parent nodes for the updated node in the hierarchical tree can be updated to reflect the portion of the tree that has changed, allowing for fast version control as the other nodes do not have to be analyzed for changes.

Various other functions can be implemented within the various embodiments as well as discussed and suggested elsewhere herein.

As mentioned, there may be many types of applications, such as games and enterprise applications, that are significant in size, such as at least 750 GB for today's applications. In various conventional approaches, applications of this size may be stored into large, single repositories, such as those referred to as mono-repos. In some instances the large repository may consist of a set of smaller repositories that are combined, with dependencies, into a single repository. Such approaches can have difficulty in application development and maintenance, particularly in situations such as making incremental changes or updates to the application. A system storing the files in a single repository using conventional approaches will typically have to load the entire repository of files even though the user system will only modify or execute a subset or relatively small portion of the code. When storing such a large set of files to a single machine, it can be difficult or impossible to store multiple versions of the application, depending upon the available resource capacity e.g., (memory) on, or available to, the specific machine. It also can be difficult to manage if there are 100 concurrent work streams attempting to modify different portions of the applications, particularly relating to version management.

Figure 1:
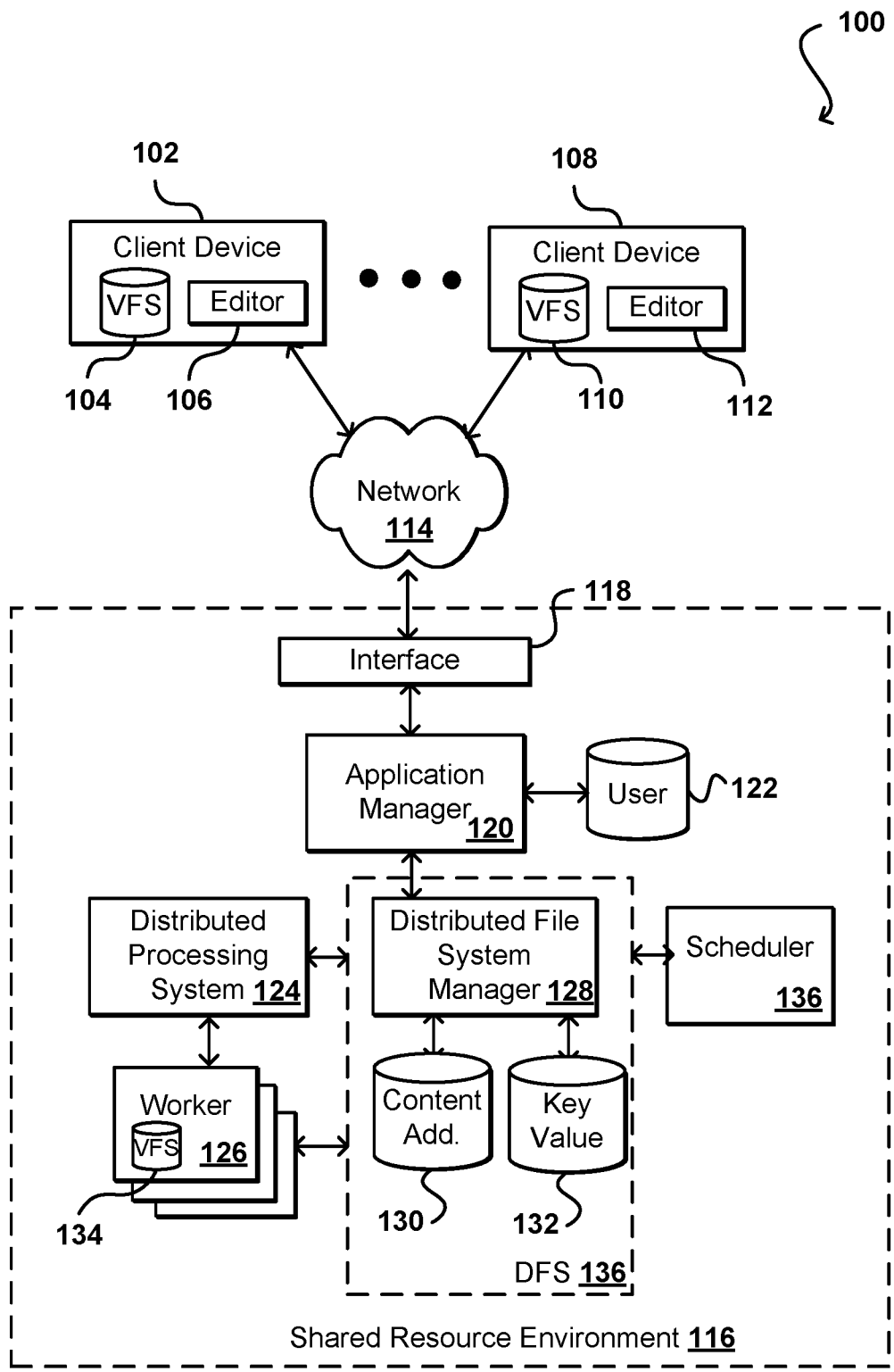
FIG. 1 illustrates an example system for managing the development and management of large applications that can be utilized in accordance with various embodiments.

As illustrated in the example system 100 of FIG. 1, approaches in accordance with various embodiments can utilize a distributed file system manager 128 to manage a distributed file system used to store files for an application, such as may involve a game or other large application. The file system can be an immutable file system, whereby objects created for the application cannot be deleted once created, provided for improved version management at the object level. The files for an application can thus be stored to a content-addressable repository 130 as individual objects, with each version of a file having a unique object stored to the repository. When a client device 102 submits a request to obtain specific files to modify for an application, an application manager 120 can work with the distributed file system manager 128 to identify the relevant objects of the appropriate version, and send the file(s) to the client device to be stored to a virtual file system (VFS) 104, in this example. An editor application 106 executing on the client device 102 can modify the relevant files stored in the VFS, and be able to obtain a view of the entire file structure for the application, while only having the client device 102 obtain and store the relevant files for the modification. When the file is updated, a new object can be stored to the content addressable repository 130 and a unique identifier for the object stored to a key value store 132, such that the distributed file system manager 128 can manage the versions of the various files for the application. Client devices can also share files back and forth, with the versions and file structure being updated as needed.

As mentioned, a variety of client devices 102, 108, each with their own editing software 106, 112 and respective VFS 104, 110, can obtain the relevant files from the content-addressable repository, or from other clients or sources as discussed herein, and can edit or execute those portions in parallel, or concurrently, with similar actions taken on other client devices. This can include utilizing batch processing or streaming processing, among other such options. While some of this execution may be performed on the various client devices, much of the execution of the overall application incorporating the modified files will be performed in the shared resource environment 116 in which the files are stored. In order to support such parallel execution, approaches in accordance with various embodiments can utilize a distributed processing system 124 that utilizes a plurality of workers 126, or processing resources or resource instances, to execute the various tasks. The distributed file system 124 can manage execution of the various tasks against the files (or objects) or the distributed file system. In at least some embodiments there can also be distributed logging of the tasks performed by the various workers 126 with respect to the application.

In the example system 100 of FIG. 1, the file system has a corresponding hierarchical representation, where files for the application are stored to a set of folders, each corresponding to a node of the hierarchy. An example of one such hierarchy is a merkle tree used for DFS. A user (or other entity) can make a change to a single file of the application. The updated file can then be stored as an object to the appropriate node in the hierarchy. In addition to modifying the corresponding node, however, the corresponding parent nodes or directories can be modified as well, all the way up to the root node of the tree. In this example, this can include modified a key identifier for each node along the path, or branch, to a value that represents a specific version. This versioning provides a straightforward and efficient mechanism to determining whether two versions of the file system are identical, particularly with respect to conventional approaches that need to scan through every file in the file system to determine whether there have been any changes, which can be very time consuming for large file structures and applications.

Accordingly, an approach such as that illustrated by the example system 100 of FIG. 1 provides for the performance of large, distributed parallel operations for an application using a combination of a distributed file system, managed by a DFS manager 128 in this example, and a distributed processing system 124. Such an approach also provides for cache (or other memory or storage) efficiency as only the portions of the file system that are impacted by a change need to be updated, without having to analyze information for each node of the hierarchical file system to determine whether or not a relevant change has occurred.

In the system of FIG. 1, any of a number of client devices 102, 108 or other computing devices, systems, services, or processes, can connect to an application manager 120 over at least one network 114, such as the Internet, an intranet, an Ethernet, a wireless network, a local area network (LAN), a dedicated gaming network, a peer-to-peer network, or a cellular network, among other such options and combinations thereof. A request can be received to an interface, such as an application programming interface (API) of an interface layer 118 of the shared resource environment 116, which can cause the request to be directed to the application manager 120. The application manager 120 can then retrieve any appropriate content from a content repository, and transmit the application content to the respective device(s).

As mentioned, in this example the application files are stored to a distributed file system, managed by a distributed file system manager 120, which can include software executing on one or more computing devices or systems in at least some embodiments. In this example the distributed file system manager 128 manages at least two repositories for each application, including a content addressable store 130 and a key value store 132. As mentioned, files for an application can be stored as objects to the content-addressable repository 130. In some embodiments the contents of the file are processed using an appropriate hashing algorithm (e.g., SHA 256 or another cryptographic hashing algorithm) to generate a hash that is used as the name of the file, or identifier of the object, etc. Such an approach ensures that two different versions of the file have different names, and that different copies of the same version or state of a file will have the same name. Such an approach can be very cache-friendly as a memory or storage manager can quickly determine whether it already has a current copy of a file using the hash name alone. The distributed file system manager 128 can then store the hash name for each file or object to a key value store 132, also called a label repository herein. Such an approach can enable any worker 126, discussed later herein, to advertise the root of its file system to other workers via the key value store 132.

Thus, the distributed file manager 128 can utilize the name information in the key value store 132 to determine the appropriate name for a specific version of a file, and can cause that version to be retrieved for the respective client device 102 submitting the request. When that client device submits a new version, the new version can be stored to the appropriate node or folder in the content-addressable repository 130 and the new name or label information can be stored in the appropriate location of the key value store 132. In some embodiments the hash name will be generated and used to store the file locally in the virtual file system 104 on the client device 102, then pushed to the content addressable repository 130. As illustrated, in some embodiments components such as the scheduler and various workers can all communicate directly with the DFS 136 instead of with (or in addition to) each other, in order to simplify the process and management of that process. This also eliminates the need for multiple interfaces in at least some embodiments.

As mentioned, in at least some embodiments the client devices will want to execute or perform processing on some of the files or objects for an application. An application manager 120, or other such system, service, component, or process, can contact a distributed processing system 124 for purposes of obtaining the appropriate processing capacity for the relevant tasks. The distributed processing system 124 can manage a pool of processing capacity, such as processing instances referred to herein as workers 126. Each worker can be a computing device, a virtual machine instance, or an application executing on a computing device, among other such options discussed and suggested herein. Each worker 126 can have a virtual file system (VFS) 134 as well, such that the worker can obtain and process only the relevant files but can store a view of the full distributed file system via the local virtual file system 134. A worker 126 can receive a task to perform with respect to one or more application files, and can contact the file system manager in this example to ensure that the worker has the current file system information and relevant files. The worker can make the relevant changes, and update the label for the current version using the appropriate hashing algorithm. The worker 126 can then push, or otherwise cause to be transmitted, the new or updated files with a label for the relevant root identifier. The workers can perform any relevant tasks with respect to the application files, such as to union two file system images, overlay or intersect the images, etc. There can be different types of workers for different types of actions or nodes, or the workers can be allocated based upon available capacity, etc. The changes can also be represented in the virtual file space 104 on the worker or client device. In some embodiments the results of the worker processing can be first delivered to the client device 102, which can then determine whether or not to publish the changes back to the distributed file system for the application stored in the shared repository containing the content addressable store and key value store 132. As mentioned, the client device 102 itself can function as a worker in at least some embodiments, where the tasks may be assigned by the processing system 124 based at least in part upon available capacity or other such factors. The various processing tasks can also be scheduled by a scheduler 136 that is part of, or separate from, the distributed processing system. The scheduler can store the task information in a queue, for example, and cause the assigned workers to pull, or otherwise obtain, the information from the task queue, although other approaches can be used as well within the scope of the various embodiments. A client device 102 can load up a file system such that the VFS 104 pulls the labels from the key value repository 132 and makes a copy of one of those labels as the root for the VFS 104. The client device can navigate to the relevant folder if a current copy is cached locally, or can pull the folder data from the content addressable repository 130, among other such options. If the client device expands one of the folders, the relevant file labels can be pulled from the key value store, which can then be used to locate the relevant object in the content addressable store for access by the client device. Such an approach can be used to determine the relevant files and folders for the change. Since the file system is immutable, the objects and files will not change so that items cached previously will not need to be reloaded unless a different version of a file is required. When a new object is created for a new version, the object gets a unique name based on the hash and the directory information is updated up to the root node as discussed herein. Once the root node is updated, the updates can be pushed to the content addressable repository 130 for shared storage. The distributed file system manager 128 can then notify the key value store 132 that the folder has a new version so that the value can be updated accordingly. Such an approach can occur in near real time, such that users of other client devices 108 can observe the changes soon after they are saved and available.

Such a system provides a processing and storage system with certain characteristics that can be used to accomplish large scale processing tasks in critical time with pseudo-optimal caching behavior. The system in some embodiments utilizes a distributed file system that is immutable, versioned, and horizontally scalable. A distributed processing system can be used that is also horizontally scalable and capable of processing jobs on files in a hierarchical data structure. The interface to the system can be a file system, such as Unix, Windows, or MacOS, among others. A job can maintain a hierarchical manifest of accessed source files and intermediates which it directly accessed, or as a union of sub-jobs. Upon a file system version change, which may occur many times per second, a rapid tree shaking difference determination (i.e., DIFF operation) can be performed between a sketch and a previous file system version. A job, or some subset of sub-jobs, may then reprocess accordingly. Such a process can execute continuously in various embodiments. Such an approach can move build systems away from manually-declared dependencies, which can otherwise present a major source of errors and inefficiency. Jobs may be executed in a highly distributed manner, with large workflows able to complete in critical path time. Applications in build system can promote rapid iteration and repeatability. There are also applications in collaborative and streaming big-data analysis. Aspects of various embodiments presented herein can also be used to provide a flexible build system as a service. Intelligent caching and recursive processing can also be used to attempt to prevent duplicate processing of the same data. The scheduler in some embodiments will manage version control, but in some embodiments additional version control functionality can be implemented as well. The current version information for the sub-trees will be stored such that the relevant version for a file can be readily determined. This can be useful for testing and development where a user, such as a developer or artist, might want to switch back and forth between various versions of the application but would prefer not to have to store all full versions on the local device. In some instances one or more file system snapshots can be stored for the VFS to ensure that the appropriate files are stored and/or obtained for the various versions.

Figure 2A:
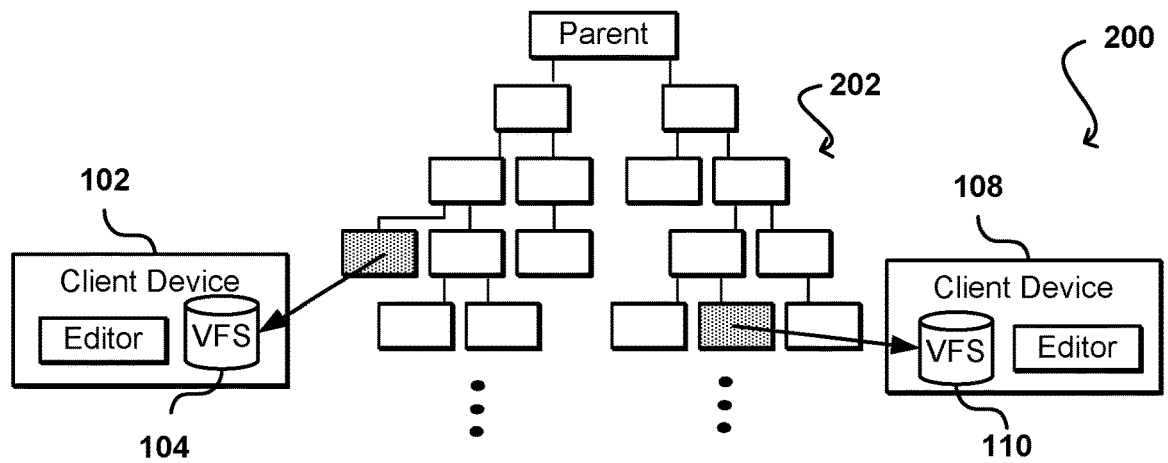
FIGS. 2A, 2B, and 2C illustrate an example approach to managing version information for a hierarchical file system that can be utilized in accordance with various embodiments.
Figure 2B:
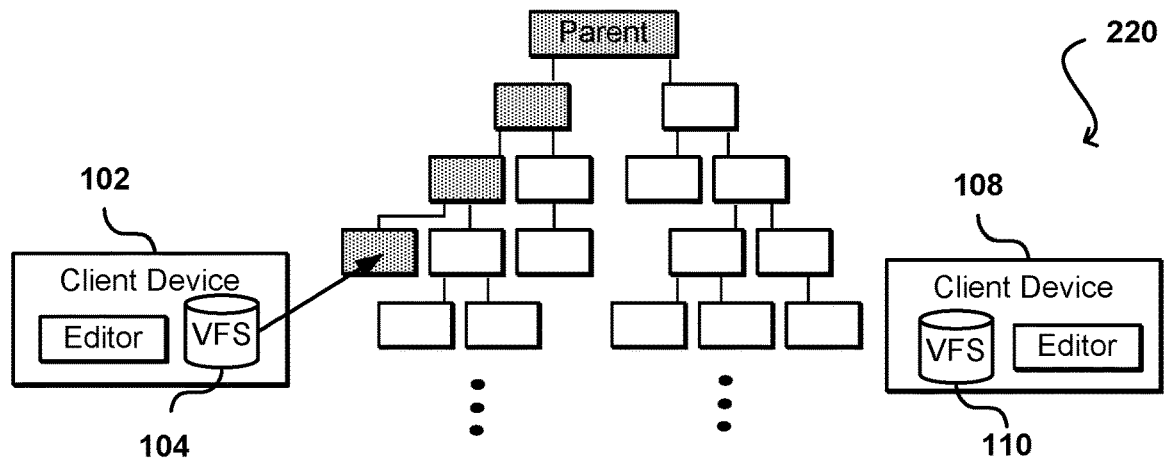
Figure 2C:
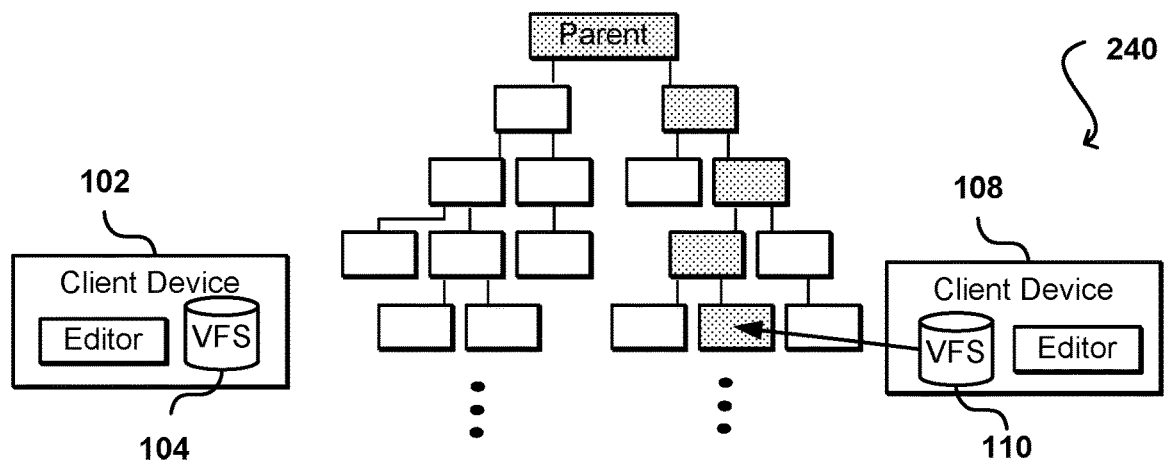

FIGS. 2A through 2C illustrate an example approach for version control for parallel processing of a distributed file system that can be utilized in accordance with various embodiments. Reference numbers may be carried over between figures for simplicity with respect to similar elements, but such usage should not be interpreted as a limitation on the scope of the various embodiments unless otherwise specifically stated herein. In the example situation 200 of FIG. 2A, two client devices 102, 108 are each able to modify different files for an application. The application is represented by a hierarchical file structure 202, and the files for the client devices can be obtained from the relevant nodes of the structure. As mentioned, the file structure can be distributed such that the files may be obtained from different locations or sources. The information for the structure, including the relevant root nodes, can be stored to the respective VFS 104, 110 on each client device, and the appropriate files obtained (if not already cached locally). In the example situation 220 of FIG. 2B, one of the client devices 102 has made modifications to one of the files for the application. The client device 102 can then push this update to the distributed file system and cause the update for the file to be written to the appropriate node of the hierarchical structure. As discussed, the parent nodes up to the root can also be modified to have the appropriate name or identifier corresponding to the new version. When the second client device 108 has completed updating a file during concurrent processing, as illustrated in the example situation 240 of FIG. 2C, the client device can cause the new object with its unique file name to be pushed to the distributed file system and its information updated to the appropriate node, with updates also being made to the names or identifiers for each parent node in the hierarchical structure, up to the root node. This enables concurrent processing by different devices or entities while ensuring proper version control in the immutable file structure.

In some embodiments the two client devices 102, 108 are not modifying the same tree in parallel. The would each start from a tree in common, make their respective edits, then each publish a completely new tree which is composed of many of the same nodes. It is really the root of the tree that gets published in those versions, which includes the version information representative of the changes. Each root node would be published as the tree for that particular client device. Each device in some embodiments could effectively load up a snapshot, make the changes, and then snapshot themselves and publish those new snapshots.

Figure 3:
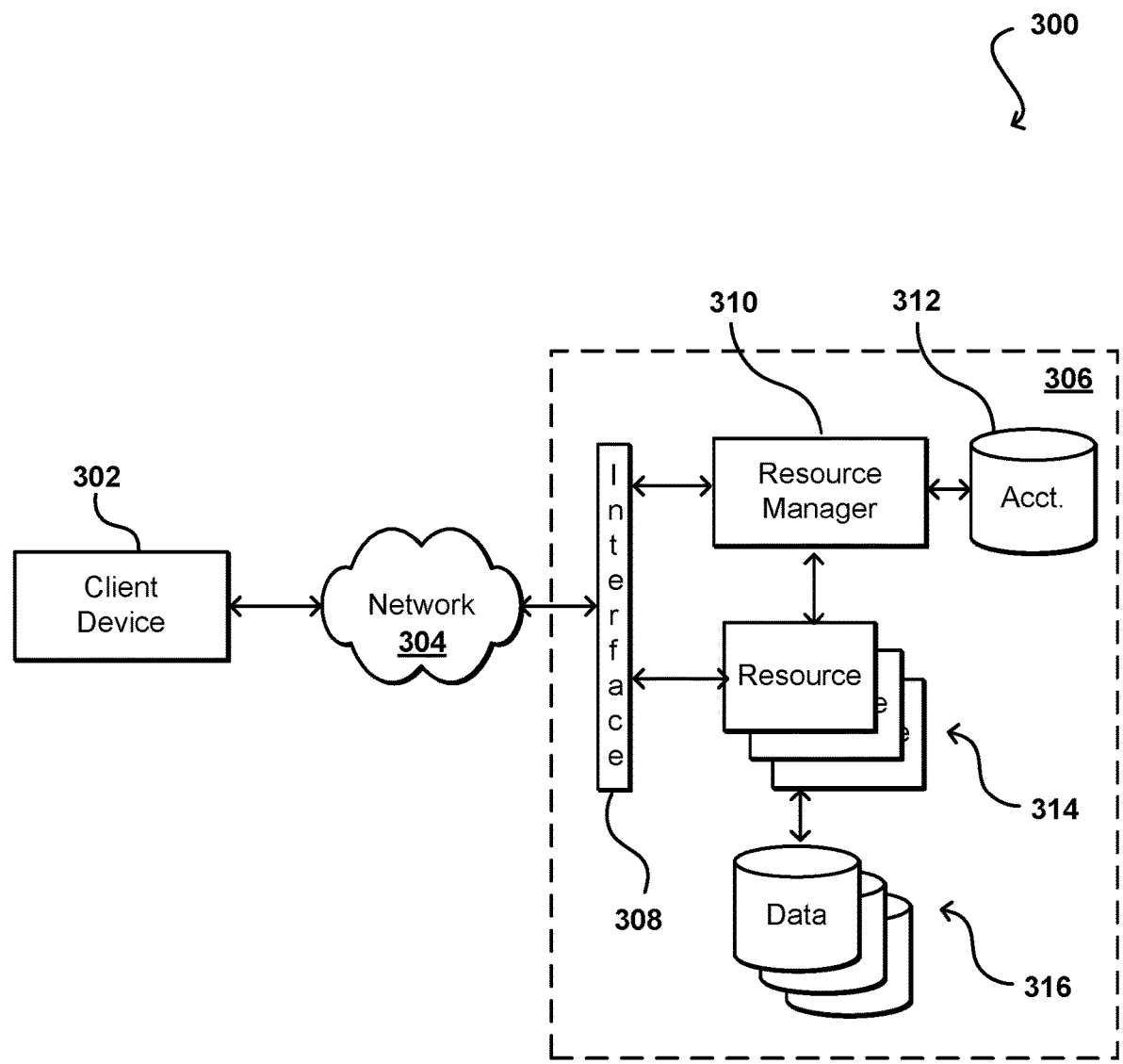
FIG. 3 illustrates an example environment in which various embodiments can be implemented.

FIG. 3 illustrates an example environment 300 in which aspects of the various embodiments can be implemented. In this example a user is able to utilize a client device 302 to submit requests across at least one network 304 to a multi-tenant resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
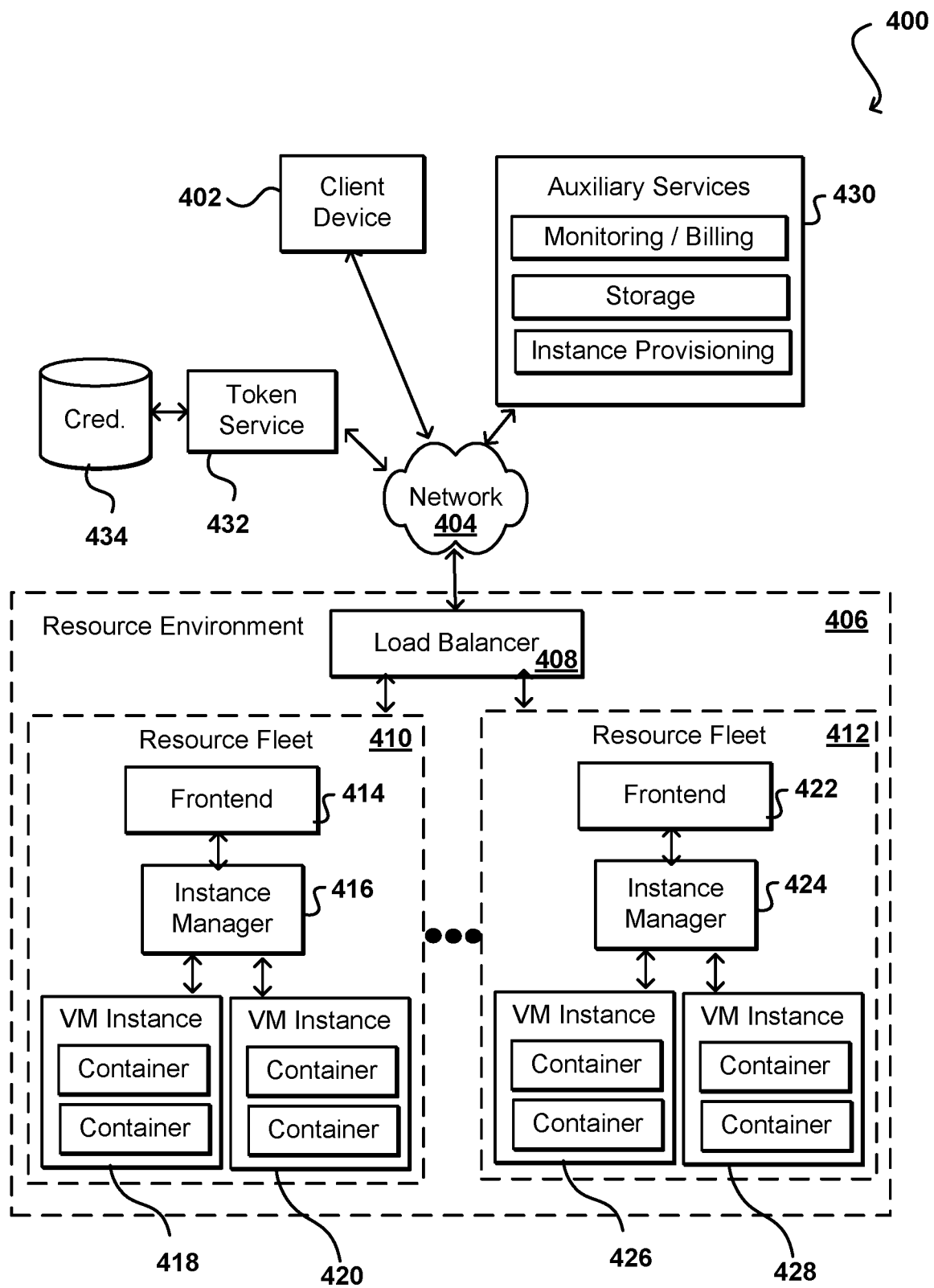
FIG. 4 illustrates an example system for managing distributed processing that can be utilized in accordance with various embodiments.

An environment such as that described with respect to FIG. 4 can facilitate the handling of requests to execute tasks on code of a specified application using a virtual compute fleet by utilizing containers created on the virtual machine instances as compute capacity. Information for a request or event can be received to a load balancer 408 that can determine an appropriate resource fleet 410, 412 to which to direct the information. The decision can be based upon various types of information, as may include the context associated with the type of event or request. Upon receiving a request to execute code on a selected virtual compute fleet 410, 412, a frontend service 414, 422 associated with the virtual compute fleet can provide the information to an instance manager, which can direct the information to a virtual machine (VM) instance 418, 420, 426, 428 where a container on the instance can provide an execution environment for the registered function.

The client device 402 may utilize one or more user interfaces, command-line interfaces (CLIs), application programing interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 4, the resource environment 406 is illustrated as being connected to at least one network 404. In some embodiments, any of the components within the recourse environment can communicate with other components (e.g., client computing devices 402 and auxiliary services 430, which may include monitoring/logging/billing services, storage service, an instance provisioning service, and/or other services that may communicate with components or services of the resource environment 406. In other embodiments, only certain components such as the load balancer 408 and/or the frontends 414, 422 may be connected to the network 404, and other components of the virtual resource service (i.e., components of the resource fleets) may communicate with other components of the resource environment 406 via the load balancer 408 and/or the frontends 414, 422.

Customers may use the resource fleets 410, 412 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 4, a first resource fleet 410 includes a frontend 414, an instance manager 416 (later referred to herein as a worker manager), and virtual machine instances 418, 420. Similarly, other resource fleets 412 can also include a frontend 422, an instance manager 424, and virtual machine instances 426, 428, and there can be any appropriate number of resource fleets and any appropriate number of instances in each resource fleet. The environment can include low and high frequency fleets as well in at least some embodiments, as may serve different types of requests or requests for different types of customers. The fleets can also include any number of worker managers, and in some embodiments the frontend and the worker manager can be resident on a single virtual machine instance.

In some embodiments, the load balancer 408 serves as a front door to all the other services provided by the virtual compute system. The load balancer 408 processes requests to execute user code on the virtual compute system and handles the first level of load balancing across the frontends 414, 422. For example, the load balancer 408 may distribute the requests among the frontends 414, 422 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 406) prior to the request is received by the load balancer 408. The virtual compute system may vary its code execution strategy based on where the code is available at the time the request is processed.

In some embodiments, the frontend 414 for a fleet can determine that the requests are properly authorized. For example, the frontend 414 may determine whether the user associated with the request is authorized to access the customer code specified in the request. The frontend 414 may receive the request to execute such customer code in response to Hypertext Transfer Protocol Secure (HTTPS)

requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 414. The frontend 414 may also receive the request to execute such customer code when an event is detected, such as an event that the customer has registered to trigger automatic request generation. For example, the customer may have registered the customer code with an auxiliary service 430 and specified that whenever a particular event occurs (e.g., a new file is uploaded), the request to execute the customer code is sent to the frontend 414. Alternatively, the customer may have registered a timed job (e.g., execute the user code every 24 hours). In such an example, when the scheduled time arrives for the timed job, the request to execute the customer code may be sent to the frontend 414. In yet another example, the frontend 414 may have a queue of incoming code execution requests, and when the batch job for a customer is removed from the virtual compute system's work queue, the frontend 414 may process the customer request. In yet another example, the request may originate from another component within the resource environment 406 or other servers or services not illustrated in FIG. 4.

A customer request may specify one or more third-party libraries (including native libraries) to be used along with the customer code. In one embodiment, the customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system 110 may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 414 can receive requests to execute customer code on the virtual compute system that have been processed by the load balancer 408. The frontend 414 can request the instance manager 416 associated with the frontend 414 of the particular fleet 410 to find compute capacity in one of the virtual machine instances 418, 420 managed by the instance manager 416. The frontend 414 may include a usage data manager for determining the usage status (e.g., indicating how frequently the user code is executed) of a particular customer code, and a customer code execution manager for facilitating the execution of customer code on one of the virtual machine instances managed by the worker manager. The instance manager 416 manages the virtual machine instances in the respective fleet. After a request has been successfully processed by the load balancer 408 and the frontend 414, the instance manager 416 finds capacity to service the request to execute customer code on the virtual compute system. For example, if there exists a container on a particular virtual machine instance that has the user code loaded thereon, the instance manager 416 may assign the container to the request and cause the request to be executed in the container. Alternatively, if the customer code is available in the local cache of one of the virtual machine instances, the instance manager 416 may create a new container on such an instance, assign the container to the request, and cause the customer code to be loaded and executed in the container. Otherwise, the instance manager 416 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 408 or frontend 414). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 430. The data may comprise user code uploaded by one or more customers, metadata associated with such customer code, or any other data utilized by the virtual compute system to perform one or more techniques described herein. Although only the storage service is illustrated in the example of FIG. 4, the resource environment 406 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system)

associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 416 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 404).

The instance manager 416 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 416 may tear down the container used to execute the user code to free up the resources it occupied to be used for other containers in the instance. Alternatively, the instance manager 416 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 416 may tear down the instance in which the container used to execute the customer code was created. Alternatively, the instance manager 416 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 430 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 416 may perform health checks on the instances and containers managed by the instance manager (e.g., an "active pool" of virtual machine instances managed by the instance manager and currently assigned to one or more customers). For example, the health checks performed by the instance manager 416 may include determining whether the instances and the containers managed by the instance manager have any issues of misconfigured networking and/or startup configuration, exhausted memory, corrupted file system, incompatible kernel, and/or any other problems that may impair the performance of the instances and the containers. In one embodiment, the instance manager 416 performs the health checks periodically. In some embodiments, the frequency of the health checks may be adjusted automatically based on the result of the health checks. In other embodiments, the frequency of the health checks may be adjusted based on customer requests. In some embodiments, the instance manager 416 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 414, 422 can route code-processing requests according to a method that is different than the method used by the load balancer 408 to route requests among the frontends. For example, a frontend 414 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified role or identity, which will have various associated permissions and privileges. A registered function can be associated with a determined role, and when a resource instance is allocated for the registered function, the resource instance can be provided with an access token, or other appropriate security credential, which can provide the access needed for that function. As illustrated in the example 400 of FIG. 4, the token can be provided by a token service 432, which can be internal or external to the resource environment 406, and may managed by the resource provider or a third party in various embodiments. The token service can store information about various types of roles and access in a credential repository 434, or other appropriate location, and in response to a request for an access token for a registered function, can determine the appropriate role and permissions and provide a corresponding access token to be provided to the allocated resource instance. The frontend 414 or instance manager 416 for a relevant resource fleet 410 can cause the configured role to be bound to the relevant host(s) when an instance of a registered function is created on that host. The role can be bound as an instance profile or other such mechanism. Once the role is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Using such an identity management model, the function instances triggered by any event could thus have access to credentials with the same privileges. For example, a registered function can have input access to a specified data bucket specified in the triggering event and write access to a corresponding database table. The assigned identity role for this function could then allow any function instance to read from any available bucket from that data source and write into any available table in the relevant database. A vulnerability present in the registered lambda function (i.e., an extensible markup language (XML) external entity resolution) could allow a producer of an event to hijack the credentials for the registered function, such as by using an XML external entity attack and retrieving the credentials from a local metadata endpoint for the data source. The security breach might then spread across the buckets of all function owners as well as all available tables in the database.

Accordingly, approaches in accordance with various embodiments attempt to enhance security and limit the impact of any vulnerabilities by creating and delivering temporary credentials for each event, or type of event, that can act as a trigger for a registered function. While the registered function might be associated with a role having a broader set of permissions, the temporary credentials derived therefrom can have privileges restricted to those required to process the triggering event. A function owner can define one or more parameterized access policies for his or her registered function(s) that can be based at least in part upon the types of triggering events for that registered function. The resource allocation service can use these parameterized access policies to generate policy instances corresponding to each event, and use the policy instances for creating and delivering the temporary credentials with each event.

Figure 5:
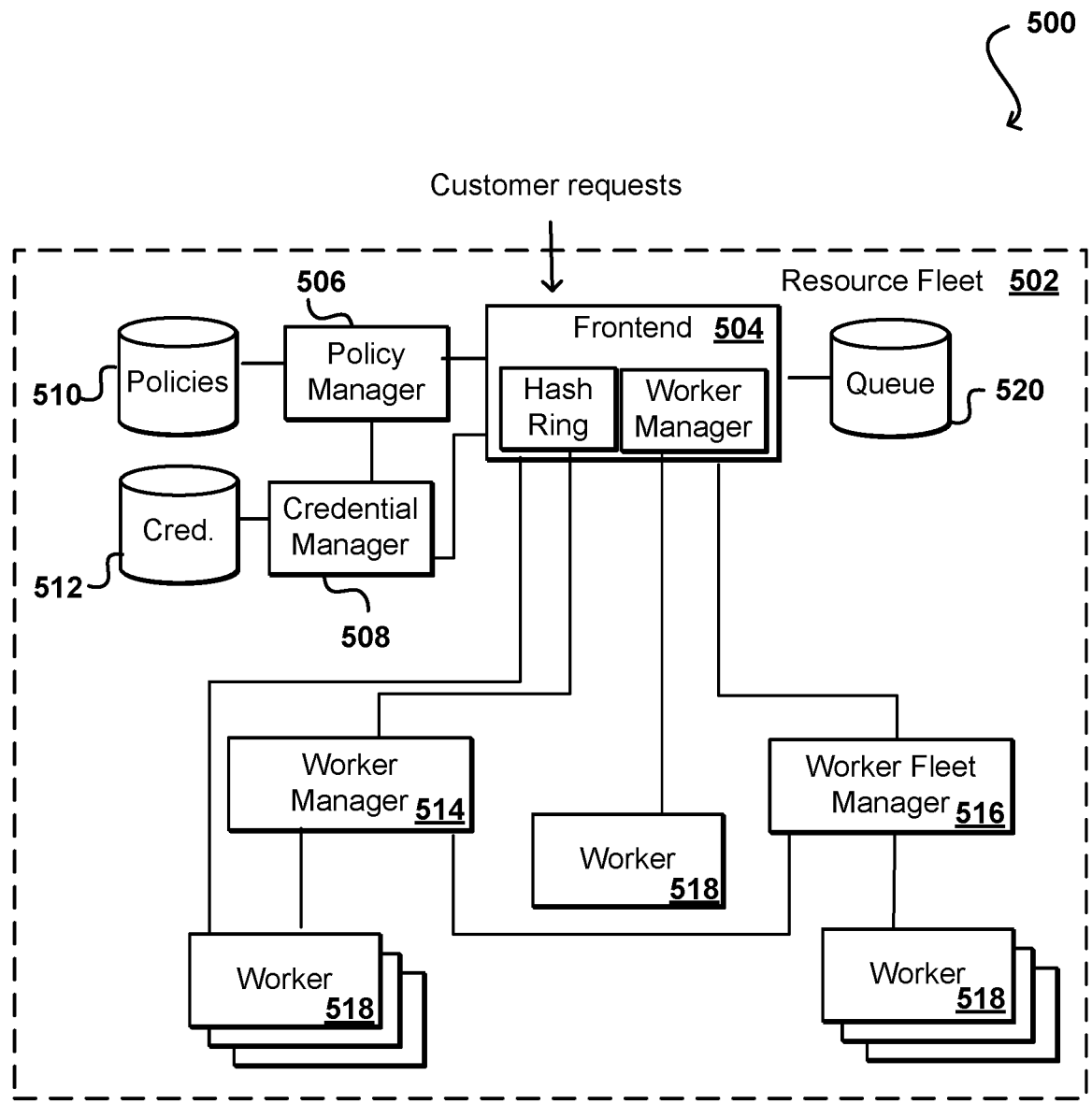
FIG. 5 illustrates utilization of worker fleets that can be utilized in accordance with various embodiments.

FIG. 5 illustrates an example environment 500 that can be used to implement at least some of this functionality. In this example, information for customer requests or events can be directed to a resource fleet 502. The information can be directed using a load balancer and/or interface layer as discussed previously as part of a resource allocation environment. In this example the resource instances will be referred to as "workers," which in various embodiments can refer to the virtual machine instances 418, 420, 426, 428 described with respect to FIG. 4. It should be understood, however, that various other types of resource instances can be utilized as workers as well within the scope of the various embodiments.

As described, the frontend 504 may receive an event notification, customer request, or other event information that indicates an event has occurred for which a registered function should be utilized or processing. In this example, the frontend 504 can determine the appropriate registered function and place the event information in an event queue 520. In other embodiments the event information might be placed into the event queue before determining the registered function, or the event information might specify the registered function, among other such options. Further, in this event the frontend 504 and/or a worker manager of the frontend can place the event information in the event queue 520, while in other embodiments other worker managers 514, 516 might receive the information and place the information in the same, or a different queue, among other such options. The frontend, worker manager, or a separate queue manager can determine that a worker 518 is now available to process the event information using the respective registered function. This can include, for example, determining that a new instance should be initialized to process the event as well as allocating an existing instance, etc. The respective worker manager 514 can then allocate the relevant worker 518 for the event, pull the event information from the event queue 520, and provide the information to the allocated worker 518 for processing using the registered function.

At some subsequent point, the allocated worker 514 will complete processing for the event. This can occur for a number of different reasons as discussed elsewhere herein. The allocated instance can return a result of the processing that can be received back to the worker manager 514 and/or the frontend 504. In some embodiments the result will go to the worker manager, so the manager knows the instance is available for processing another event, and then can go to the frontend, so the frontend can provide any appropriate response or take another appropriate action.

In order to process the event, a worker 518 will have to be allocated for the relevant registered function. As mentioned, the worker will need to obtain the appropriate access credential(s) for the registered function, as may be determined by a role bound to that instance for the registered function. As mentioned, the role can provide various types of access for a determined period of time, such as fifteen minutes in some embodiments, although other lengths of time can be specified as well. Since there can be various types of triggering events for a function, the role can enable access to all relevant data for any of those events for the entire lifecycle of the function. As mentioned, however, granting all the access provided under the role can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Accordingly, approaches in accordance with various embodiments can provide event-specific credentials that are derived from an identity role bound, or otherwise associated, to the registered function for a resource instance. The necessary privileges can be provided under the role, but the restricted credentials can prevent access outside that needed to process the event. A system, component, or service such as a credential manager 508 can create a temporary token that has access only to those input and output sources required for processing the event, and can cause that token to be passed to the relevant worker 518 allocated for the event. The event-specific credential can be bound to the resource instance allocated in response to a specific event, and the permissions granted under the temporary credential determined based upon the specific event. The credential manager 508 can generate a temporary token that is event-specific, and can cause that temporary token to also be stored to a credential repository 512 or other appropriate cache such that the credentials can be passed to any other resource instance allocated for a registered function in response to the same type of event.

The event-specific credential can be generated according to the security token bound to the registered function and received from the token service in at least some embodiments. In order to determine which subset of permissions to be granted from the token, a function owner can define one or more relevant access policies that can be stored to a relevant policy data store 510 or other accessible location. A policy manager 506, or other such system or service, can work with the credential manager 508 to determine the appropriate policy for an event, which the credential manager 508 can then use to determine the appropriate permissions and generate the temporary credential to be provided to the allocated worker 518. The policy manager in some embodiments can maintain a mapping between the policies and events, in order to derive the appropriate temporary credentials from the function role. It should be understood that in at least some embodiments the policy manager 506 and/or credential manager 508 could be implemented in the frontend 504, an event router, or another such component discussed or suggested herein.

In at least some embodiments a function owner can provide a template policy which includes variables whose values will be specific to an event. This can include, for example, identifiers for the input and output data sources to which access can be granted, as well as the type of access and other such information. For each event, the available access for the relevant role can be determined, and the variable values for the event inserted into the template policy. The policy manager can then ensure that the permissions per the policy are contained within the overall permissions of the role, and if so can generate the temporary credential to be provided to the allocated worker. In some embodiments the credential manager can generate the event-specific credentials, while in other embodiments the credential manager can submit a request to the token service to receive an event-specific token, among other such options. As mentioned, the credential manager 508 can cache a received event-specific token in a local credential cache 512 to be used for other similar events for the registered function over the lifetime of the temporary credential.

In some embodiments the frontend 504 or worker manager 514 will perform a lookup to determine the relevant role for a function before performing the worker allocation. The frontend or worker manager can also, directly or via a policy manager 506, determine the appropriate template policy mapped to the specific event. The frontend or worker manager can then, directly or via the credential manager, begin filling in the template using the event-specific values. As an example, a registered function might be triggered by a notification event on a storage service, and the event can be received from any bucket on that storage service. The respective values can be filled into the policy template with the specific buckets, tables, or other sources specified in the policy. The policy can then be instantiated into a specific string, such that the policy does not have any value to other parties. The variables in the template policy are thus filled with the respective values from the triggering event. The event-specific policy can then be processed with the base credential received for the role to obtain a second token that has restricted privileges, from the base credentials, specific to the triggering event. The event and the temporary event-specific token can then be passed along to the allocated worker. If any of the credentials are leaked or otherwise obtained by an unintended third party, the credentials would only provide access to the specific input and output sources for the event. The event-specific credentials can also have a shorter period of time in some embodiments, such as on the order of a couple of minutes at most, which can be much shorter than the lifetime of the base credentials for the role. This can include, for example, periods that start right away but end before the valid lifetime of the base credential ends, or can include a specified period of time in the future corresponding to a predicted execution time of the registered function for the event, among other such options.

Figure 6:
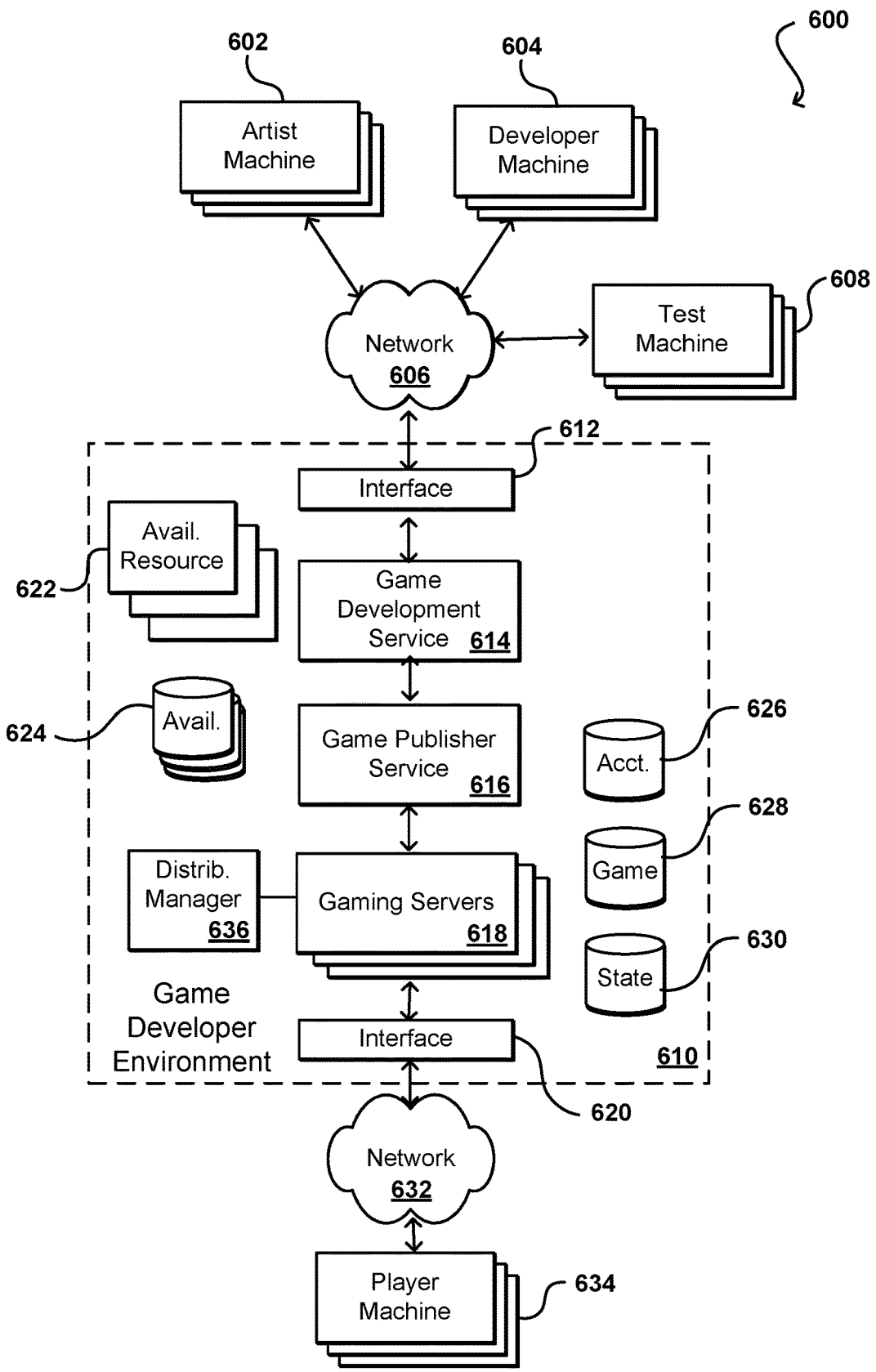
FIG. 6 illustrates an example gaming pipeline that can be used in accordance with various embodiments.

As illustrated in the example system 600 of FIG. 6, at least some of the resources can be used to support platforms and services useful in the development and providing of electronic gaming and three-dimensional graphical content, among other such options. For example, the artist machines 602 and developer machines 604 can collaborate via a game development service 614, which can be provided by a set of resources in a game developer environment 610, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 628, where the repositories can include graphics files, code, audio files, and the like. The game development service 614 can also work with an account manager, or at least maintain information in an account data store 626, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 616. The game publisher service 616 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 604 or otherwise. In some embodiments the game content might be published and made available to one or more test machines 608, which may be associated with the customer, such that the customer can test various builds or versions of the game. In some embodiments feedback provided by the test machines 608 may be provided to the game development service 614, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 618 which can run the game and enable player machines 634 to access the game content over one or more networks 632, which may be different from the network(s) 606 used for game development. This can include, for example, dedicated gaming networks, the Internet, cellular networks, and the like. The player machines 634 can communicate with the appropriate interfaces of an interface layer 620 to obtain the gaming content. In some embodiments the player machines 632 will download the gaming content for execution on the individual machines, and will upload (or otherwise communicate) gaming data, messages, and other information to the gaming servers 618, as well as to other players, social networking sites, or other such recipients. The gaming servers 618 can cause state information for the various instances of the game to be stored to at least one game state repository. This can hold state for the game as a whole or for individual game sessions, among other such options. As mentioned, in some embodiments the devices can send position or image data to a dedicated gaming server 618 or other component in the game developer environment 610, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 634 in order for those devices to render the appropriate AR content for the location and orientation of a given device. In some embodiments the game content can be executed by the game servers and streamed in near real time to the player machines 634. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 618 or other such systems, services, or components can utilize a surface mapping service, for example, that is able to receive position, orientation, and object location data, among other types of data discussed herein, and generate an authoritative mapping of a specific area or region, such as a gameplay region. In this example, each player device 634 can send the information to an allocated gaming server 618 for the gaming session, which can then communicate the relevant information with the surface mapping service so that the surface mapping service can update the authoritative data set as appropriate, as well as to obtain from the mapping service any relevant position or other data that should be sent to one or more devices based on, for example, changes in the orientation or location of the device, as well as for changes of other objects or positions in the mapped region as well. As mentioned, in some embodiments the information can be sent as needed for a current view of a player device, and at least some of that data can be retained in cache or memory on the device such that only changes to the data need to be transmitted, and in some embodiments the devices can each build a model of the mapped region over time. As mentioned, in some embodiments the player devices 634 can communicate with each other as well, such as to send updates in player device location or orientation, or to communicate updates in the authoritative data set, among other such options. As mentioned, in various embodiments the modification of any files can be performed using at least one distributed processing and/or storage manager 636, which can handle tasks such as worker assignment and version control as discussed herein.

Figure 7:
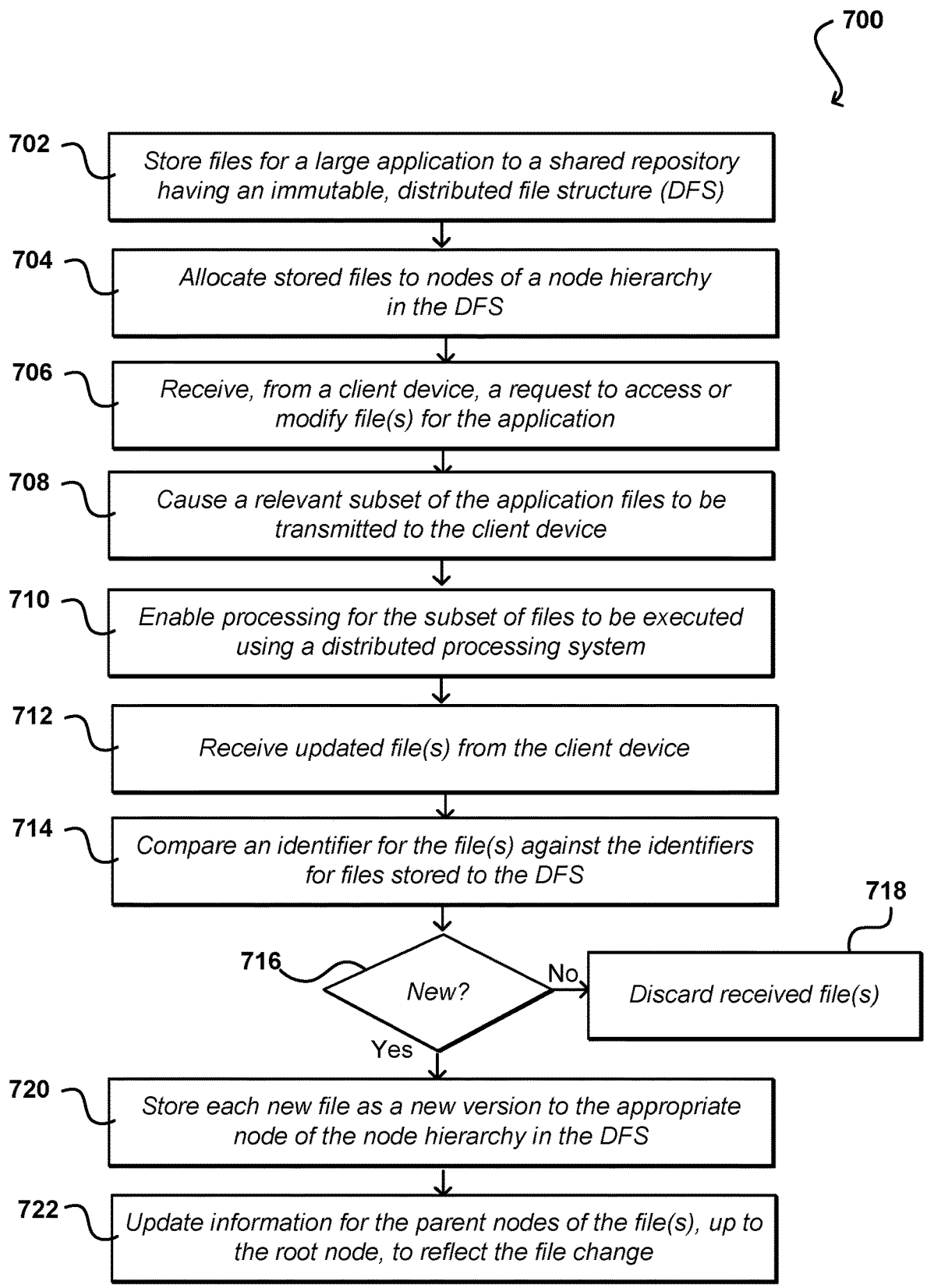
FIG. 7 illustrates an example process for managing updates to an application stored to a distributed file system that can be utilized in accordance with various embodiments.

FIG. 7 illustrates an example process 700 for managing updates to a large application having files stored to an immutable distributed file system that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, a set of files for a large application, such as a game or enterprise application, is stored to a shared repository having an immutable, distributed file structure (DFS). The files can be allocated 704 to node of a hierarchical structure of the DFS, where the nodes of the hierarchy in some embodiments correspond to folders or containers that each have a directory including the names or identifiers of objects stored therein, and where there may be multiple version of a file tracked by a unique name or identifier, such as may be a result of hashing contents of the files as discussed herein.

A request can be received from a client device, or other such source, for access to one or more files for the application, such as to modify a file or create a new file, among other such options. Assuming any authentication or authorization is performed successfully, and the client device has such permission with respect to the files in this example, a relevant subset of the application files can be caused 708 to be transmitted from the shared repository, or another client, etc., to the requesting client device. Processing of the subset of files can be enabled 710 to be executed using a distributed processing system. Workers or processing capacity of the distributed processing system can include the client device, virtual machines of the application provider, or other such sources. In response to any updates or modifications, any new or updated files can be received 712 from the client device. As mentioned, in at least some embodiments the files can be received as objects having unique, version-specific names or identifiers, such as may be generated using a hashing algorithm on contents of the new or updated files. The identifier for each received file can be compared against identifiers for files or objects stored to the DFS. A determination can be made 716 as to whether a file is new or otherwise not currently stored to the DFS. If the file is already stored to the DFS, the received file can be discarded. If the file is new, however, the new file can be stored 720 as a new version to the appropriate node of the node hierarchy in the DFS, and the directory information for that node updated accordingly. The information for the parent nodes can be updated as well, up to the root node, to reflect the change, such as to include version-specific information in the relevant directories. As mentioned, this process can be performed concurrently for multiple client devices accessing various files of the application.

In some embodiments, when a snapshot from DFS is mounted the OS begins to read from the snapshot as if it is a local file system. Much of the process of FIG. 7 then occurs at the block level, or the node level, etc. And this can occur quite often, such as tens of thousands of times per second or more. It will then only load up or write back those blocks or nodes as they change in real time. At the time of process completion the data can be flushed and any remaining changes can be stored to DFS. The respective root node can then be published to a snapshot table that includes roots for the various versions.

Figure 8:
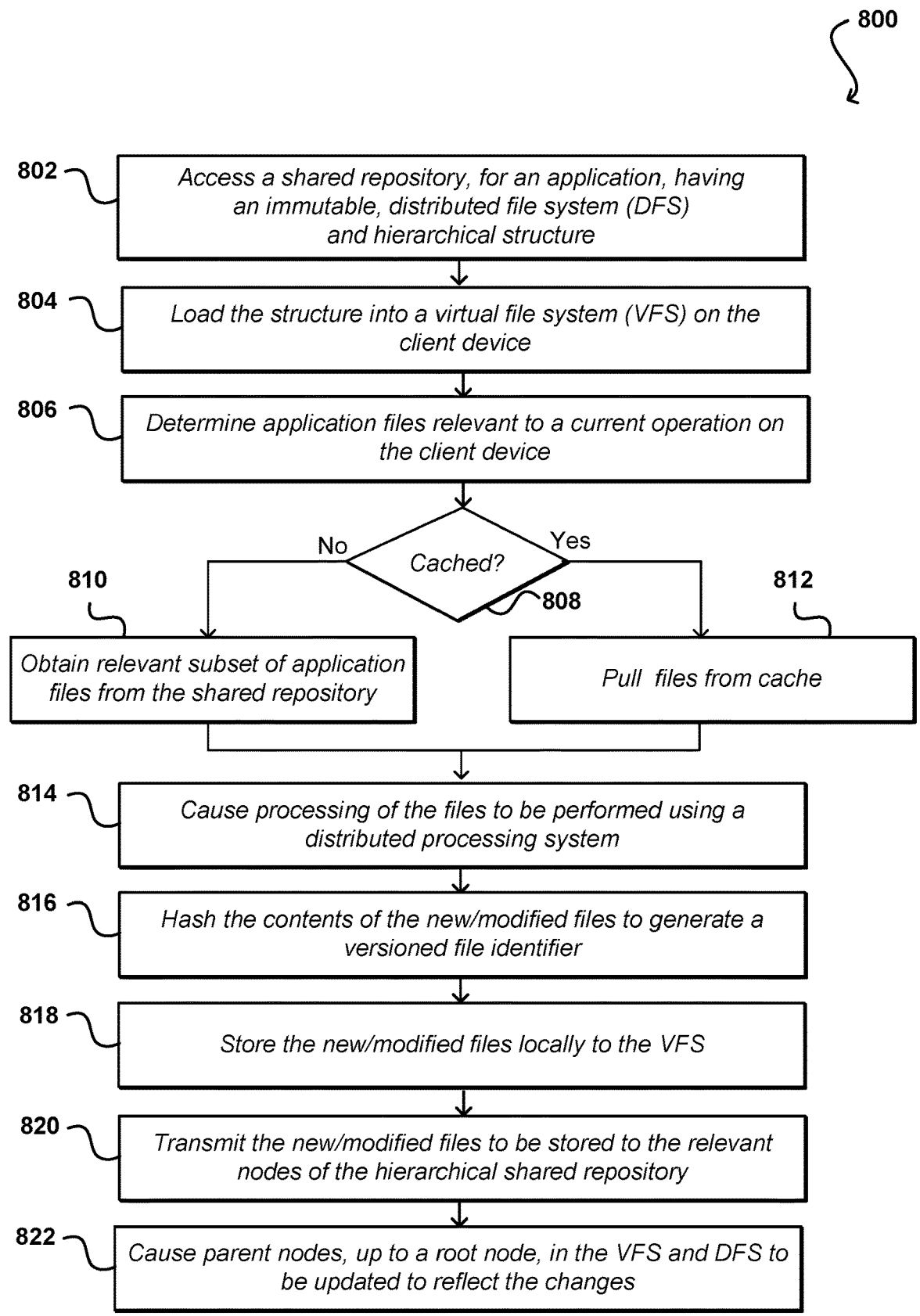
FIG. 8 illustrates an example process for updating application files shared to a distributed file system that can be utilized in accordance with various embodiments.

FIG. 8 illustrates an example process 800 for modifying files of such an application using a client device that can be utilized in accordance with various embodiments. In this example, a client device can access 802 a shared repository storing files for an application. As in the example of FIG. 7, the repository can have an immutable, distributed file system (DFS) and a hierarchical structure, wherein each file is stored to a node of the hierarchy. The file structure can be located into a virtual file system (VFS) on the client device, such that the client device has access to the entire structure, and can expand branches of the hierarchy as appropriate. As mentioned elsewhere herein, a virtual machine or other processing component can perform these actions as well as part of a distributed processing system. It can be determined 806, on the client device or elsewhere, which application files are relevant to a current (or anticipated) operation on the client device. If it is determined 808 that any or all of those files are cached locally to the device, then those files can be pulled 812 from cache. If any of the files are not cached locally, or otherwise locally available, then the relevant subset of application files can be obtained 810 from the shared repository according to the DFS. Once the files are obtained, the processing of the files can be caused 814 to be performed using a distributed processing system, which can include the client device and/or at least one remote processing device.

For any new or updated files, the contents can be hashed 816 in this example to generate a unique identifier that is specific to this version of the file. A hashing or similar approach can also ensure that each different version has a unique identifier, and that similar versioned files have the same identifier, etc. The new or modified files can then be stored 818 locally to the VFS. The new or modified files can also be transmitted 820 to be stored to the relevant nodes of the hierarchical structure of the DFS. The parent nodes can also be caused 822 to be updated, up to the root node, to reflect the changes in both the VFS and the DFS. In this way the changes are reflected both locally and globally with respect to the application.

Figure 9:
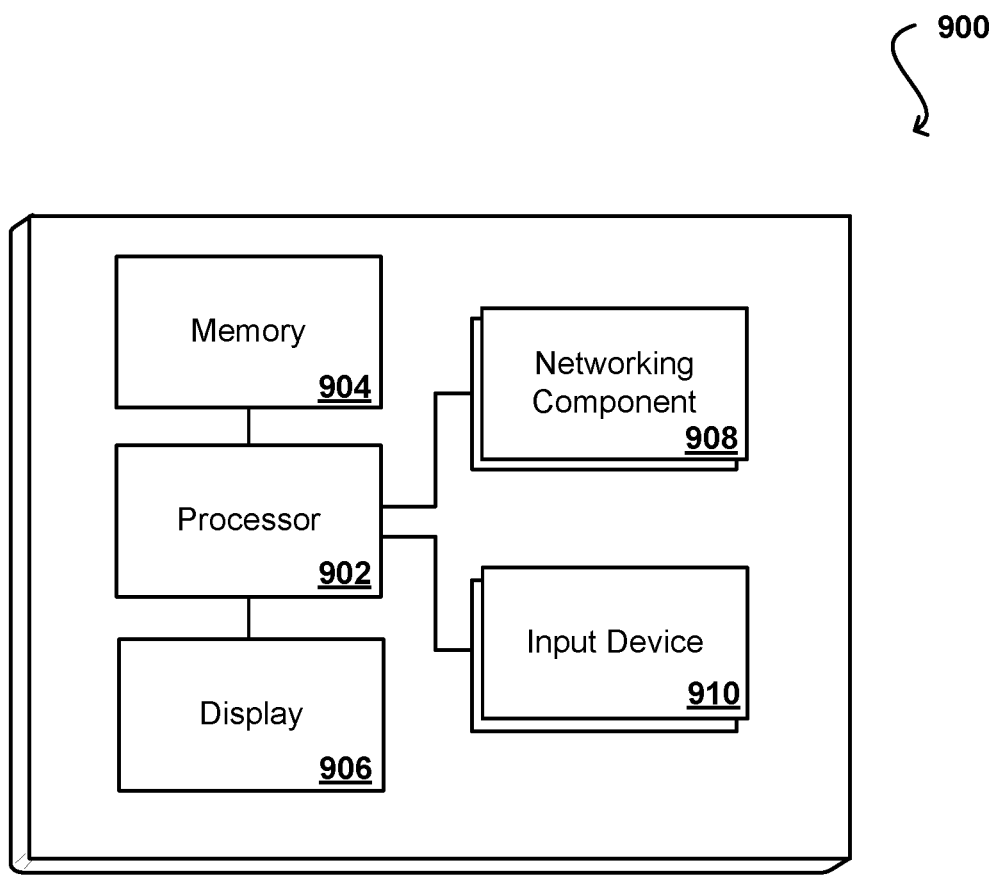
FIG. 9 illustrates example components of a computing device that can be used to implement aspects of the various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   storing files for an application to a shared repository having a distributed file structure, files of the application being associated with nodes of a node hierarchy of the distributed file structure, the distributed file structure being immutable;
   receiving requests from a set of computing devices to modify respective files of the application;
   enabling relevant files of the application to be transmitted to the computing devices, the relevant files comprising different subsets of files for the application;
   enabling, using a distributed processing system, the files to be modified by the computing devices and stored as objects to respective nodes of the node hierarchy in the shared repository; and
   updating node information for the respective nodes, and parent nodes of the respective nodes, in the node hierarchy of the distributed file structure.

2. The computer-implemented method of claim 1, further comprising:
   receiving a modified file for the application, the modified file having an identifier unique to a version of the modified file generated using a hashing algorithm with respect to contents of the modified file; and
   verifying that a stored file with the identifier is not already present in the respective node before storing the modified file as an object to the respective node.

3. The computer-implemented method of claim 1, further comprising:
   performing a rapid tree shaking difference determination between a current version of the distributed file structure, resulting from storing the objects for the modified files to the respective nodes, and a previous version of the distribute file structure; and
   reprocessing at least a subset of tasks based at least in part upon the difference determination.

4. The computer-implemented method of claim 1, further comprising:
   providing information for the distributed file structure to the set of computing devices in order to enable the computing devices to locally store a view of the distributed file structure in a virtual file structure stored on the respective computing device.

5. The computer-implemented method of claim 1, further comprising:
   sending a set of tasks, for the files to be modified, to the distributed processing system; and
   allocating a set of processing resources to perform the set of tasks.

6. A computer-implemented method, comprising:
   receiving a request to modify a file of an application stored to a distributed file structure, the file associated with a respective node of a node hierarchy of the distributed file structure;
   enabling, using a distributed processing system, the file to be modified and stored as an object to the respective node; and
   updating an identifier for the respective node, and parent nodes of the respective node, in the node hierarchy of the distributed file structure.

7. The computer-implemented method of claim 6, further comprising:
   receiving a second request to modify a second file of the application associated with a second node; and
   enabling, using the distributed processing system, the second file to be modified concurrently with, but on a separate computing device from, the file associated with the respective node.

8. The computer-implemented method of claim 6, wherein the distributed file structure is immutable.

9. The computer-implemented method of claim 6, further comprising:
   determining a set of tasks corresponding to modification of the file; and
   allocating a set of processing resources to perform the set of tasks.

10. The computer-implemented method of claim 6, further comprising:
    storing the object to a content-addressable repository in the distributed file system; and
    storing the identifier for the object to a key-value store of the distributed file system usable to locate the object associated with a specific version.

11. The computer-implemented method of claim 6, further comprising:
    sending one or more files for the application to a computing device for modifying the one or more files;
    providing information for the distributed file structure to the computing device in order to enable the computing device to locally store a view of the distributed file structure in a virtual file structure stored on the computing device; and
    receiving the object and identifier from the computing device.

12. The computer-implemented method of claim 11, wherein the computing device is a client device or a virtual machine executing in a resource environment.

13. The computer-implemented method of claim 6, further comprising:
    performing a rapid tree shaking difference determination between a current version of the distributed file structure, resulting from storing the object to the respective node, and a previous version of the distribute file structure; and
    reprocessing at least a subset of tasks for the application based at least in part upon the difference determination.

14. The computer-implemented method of claim 6, further comprising:
    receiving a modified file for the application, the modified file having an identifier unique to a version of the modified file generated using a hashing algorithm with respect to contents of the modified file; and
    verifying that a stored file with the identifier is not already present in the respective node before storing the modified file as an object to the respective node.

15. A system, comprising:
    at least one processor; and
    memory including instructions that, when executed by the at least one processor, cause the system to:

receive a request to modify a file of an application stored to a distributed file structure, the file associated with a respective node of a node hierarchy of the distributed file structure;

enable, using a distributed processing system, the file to be modified and stored as an object to the respective node; and update an identifier for the respective node, and parent nodes of the respective node, in the node hierarchy of the distributed file structure.

16. The system of claim 15, wherein the instructions when executed further cause the system to:

receive a second request to modify a second file of the application associated with a second node; and enable, using the distributed processing system, the second file to be modified concurrently with, but on a separate computing device from, the file associated with the respective node.

17. The system of claim 15, wherein the distributed file structure is immutable.

18. The system of claim 15, wherein the instructions when executed further cause the system to:

determine a set of tasks corresponding to modification of the file; and allocate a set of processing resources to perform the set of tasks.

19. The system of claim 15, wherein the instructions when executed further cause the system to:

store the object to a content-addressable repository in the distributed file system; and store the identifier for the object to a key-value store of the distributed file system usable to locate the object associated with a specific version.

20. The system of claim 15, wherein the instructions when executed further cause the system to:

send one or more files for the application to a computing device for modifying the one or more files;

provide information for the distributed file structure to the computing device in order to enable the computing device to locally store a view of the distributed file structure in a virtual file structure stored on the computing device; and receive the object and identifier from the computing device.

* * * * *